United States Patent
Chitrakar et al.

(10) Patent No.: US 12,028,841 B2
(45) Date of Patent: Jul. 2, 2024

(54) COMMUNICATION APPARATUS AND COMMUNICATION METHOD FOR MULTI-BAND OPERATION

(71) Applicant: Panasonic Intellectual Property Corporation of America, Torrance, CA (US)

(72) Inventors: Rojan Chitrakar, Singapore (SG); Lei Huang, Singapore (SG); Yoshio Urabe, Nara (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 620 days.

(21) Appl. No.: 17/269,946

(22) PCT Filed: Jun. 12, 2019

(86) PCT No.: PCT/SG2019/050296
§ 371 (c)(1),
(2) Date: Feb. 19, 2021

(87) PCT Pub. No.: WO2020/050773
PCT Pub. Date: Mar. 12, 2020

(65) Prior Publication Data
US 2021/0227547 A1    Jul. 22, 2021

(30) Foreign Application Priority Data
Sep. 5, 2018   (SG) .......................... 10201807626Y

(51) Int. Cl.
*H04W 72/0453*   (2023.01)
*H04W 88/08*   (2009.01)

(52) U.S. Cl.
CPC ........ *H04W 72/0453* (2013.01); *H04W 88/08* (2013.01)

(58) Field of Classification Search
CPC . H04W 72/0453; H04W 88/08; H04W 48/12; H04W 52/0216; H04W 84/12;
(Continued)

(56) References Cited

U.S. PATENT DOCUMENTS

| 8,849,289 B2 | 9/2014 | Kwon et al. |
| 8,982,820 B1 | 3/2015 | Cordeiro et al. |

(Continued)

FOREIGN PATENT DOCUMENTS

| CN | 105323826 A | 2/2016 |
| CN | 106658600 A | 5/2017 |
| WO | WO 2006107698 A2 | 10/2006 |

OTHER PUBLICATIONS

Multi-band WLAN Management, DOCOMO (Year: 2009).*
(Continued)

*Primary Examiner* — Sudesh M Patidar
(74) *Attorney, Agent, or Firm* — Seed IP Law Group LLP

(57) ABSTRACT

Provided is a multi-band communication apparatus including a transmitter and a receiver. The transmitter transmits, in a wireless network and to multi-band communication devices, frames on a frequency band that include actions related to the frequency band and to at least one other frequency band in which the multi-band communication apparatus transmits. The receiver receives, in the wireless network, from the multi-band communication devices, frames on the frequency band that include actions related to the frequency band and to the at least one other frequency band in which the multi-band communication apparatus receives.

14 Claims, 16 Drawing Sheets

(58) Field of Classification Search
CPC ..... H04W 88/06; H04W 12/06; H04W 76/10; H04W 88/10; H04L 5/0091; Y02D 30/70
See application file for complete search history.

(56) References Cited

U.S. PATENT DOCUMENTS

| | | | |
|---|---|---|---|
| 9,456,462 B2 | 9/2016 | Cordeiro et al. | |
| 2010/0284393 A1* | 11/2010 | Abraham | H04L 5/005 370/343 |
| 2010/0332822 A1 | 12/2010 | Liu et al. | |
| 2012/0094706 A1* | 4/2012 | Fukumoto | H04W 72/51 455/512 |
| 2012/0155385 A1 | 6/2012 | Bencheikh | |
| 2012/0300759 A1* | 11/2012 | Patanapongpibul | H04W 48/14 370/338 |
| 2013/0114586 A1* | 5/2013 | Kim | H04W 16/14 370/338 |
| 2015/0207578 A1 | 7/2015 | Ramamurthy et al. | |
| 2015/0289299 A1 | 10/2015 | Abraham et al. | |
| 2016/0227535 A1 | 8/2016 | Sharma et al. | |
| 2017/0006609 A1* | 1/2017 | Adachi | H04W 72/0453 |
| 2017/0019785 A1* | 1/2017 | Liu | H04W 12/041 |
| 2017/0223587 A1 | 8/2017 | Trainin et al. | |
| 2018/0035431 A1* | 2/2018 | Cordeiro | H04W 72/0453 |
| 2018/0206190 A1* | 7/2018 | Cherian | H04L 1/1621 |
| 2018/0288764 A1* | 10/2018 | Ramamurthi | H04W 24/08 |
| 2019/0082373 A1* | 3/2019 | Patil | H04L 1/1614 |
| 2019/0373439 A1* | 12/2019 | Abouelseoud | H04L 5/1469 |

OTHER PUBLICATIONS

International Search Report, dated Sep. 9, 2019, for corresponding International Application No. PCT/SG2019/050296, 6 pages.
Russian Office Action, dated Feb. 22, 2023, for Russian Patent Application No. 1 2021101936/07(004000). (14 pages) (English translation).
English Translation of Chinese Search Report dated Dec. 18, 2023, for the corresponding Chinese Patent Application No. 2019800545907. (3 pages).

* cited by examiner

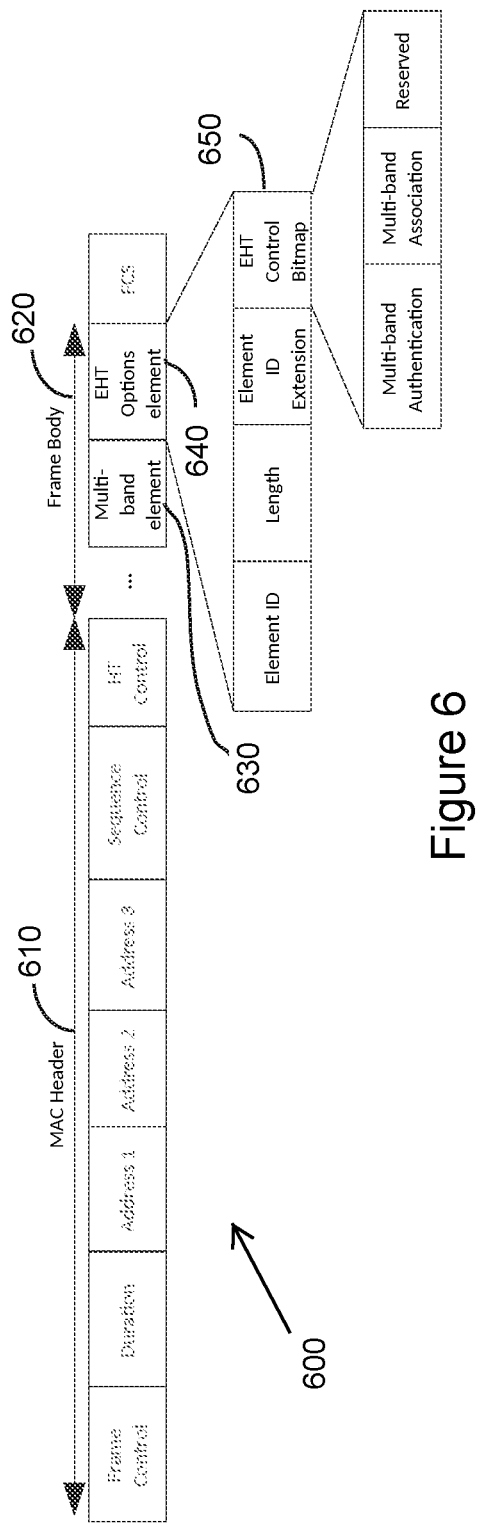

2.4 GHz Association Records

| STA AID | Association State | MAC Address | Pairwise Cipher Key | Group Cipher Key |
|---|---|---|---|---|
| STA2 - | 2 | 35-25-C3-D2-93-01 | | |
| : | : | : | : | : |

5 GHz Association Records

| STA AID | Association State | MAC Address | Pairwise Cipher Key | Group Cipher Key |
|---|---|---|---|---|
| STA1 0x2001 | 4 | 10-8D-5C-B1-9B-02 | | |
| STA2 0x2002 | 4 | 35-25-C3-D2-93-02 | | |
| : | : | : | : | : |

Figure 13

6 GHz Association Records

| | STA AID | Association State | MAC Address | Pairwise Cipher Key | Group Cipher Key |
|---|---|---|---|---|---|
| STA1 | 0x3001 | 4 | 10-8D-5C-B1-9B-01 | | |
| STA2 | - | 2 | 35-25-C3-D2-93-01 | | |
| | : | : | : | : | : |

| | 2.4 GHz AID | 5 GHz AID | 6 GHz AID |
|---|---|---|---|
| STA1 | - | 0x2001 | 0x3001 |
| STA2 | - | 0x2002 | - |
| | : | : | : |

COMMUNICATION APPARATUS AND COMMUNICATION METHOD FOR MULTI-BAND OPERATION

BACKGROUND

1. Technical Field

The present disclosure generally relates to multi-band communication apparatus, multi-band access point and communication methods for multi-band operation, and more particularly relates to multi-band communication devices that operate on multiple frequency bands in a wireless network.

2. Description of Related Art

Wireless networks that offer multi-band communication enable electronic devices to communication over multiple different frequency bands. Such networks have advantages over other wireless networks in which wireless communication is limited to a single frequency band.

SUMMARY

One non-limiting and exemplary embodiment facilitates providing communication over multiple frequency bands between electronic devices in a wireless network. By way of example, this communication includes authenticating and/or associating, via a single frequency band, multi-band communication devices over multiple different frequency bands.

In one general aspect, the techniques disclosed here feature a multi-band communication apparatus that includes a transmitter and a receiver. The transmitter, which in operation, transmits, in a wireless network and to multi-band communication devices, frames on a frequency band that include actions related to the frequency band and to at least one other frequency band in which the multi-band communication apparatus transmits. The receiver, which in operation, receives, in the wireless network, from the multi-band communication devices, frames on the frequency band that include actions related to the frequency band and to the at least one other frequency band in which the multi-band communication apparatus receives.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with present embodiments.

FIG. 6 is a frame for authenticating and/or associating multi-band STAs across multiple different frequency bands.

FIG. 7 is an example Association Record maintained by a multi-band EHT AP.

FIG. 12 is table of 2.4 GHz association records for a STA.

FIG. 13 is table of 5 GHz association records for two stations, STA1 and STA2.

FIG. 14 is table of 6 GHz association records for two stations, STA1 and STA2.

FIG. 15 is a table showing example STA AID data for two stations (STA1 and STA2) for 2.4 GHz AID, 5 GHz AID, and 6 GHz AID.

Figure 1:
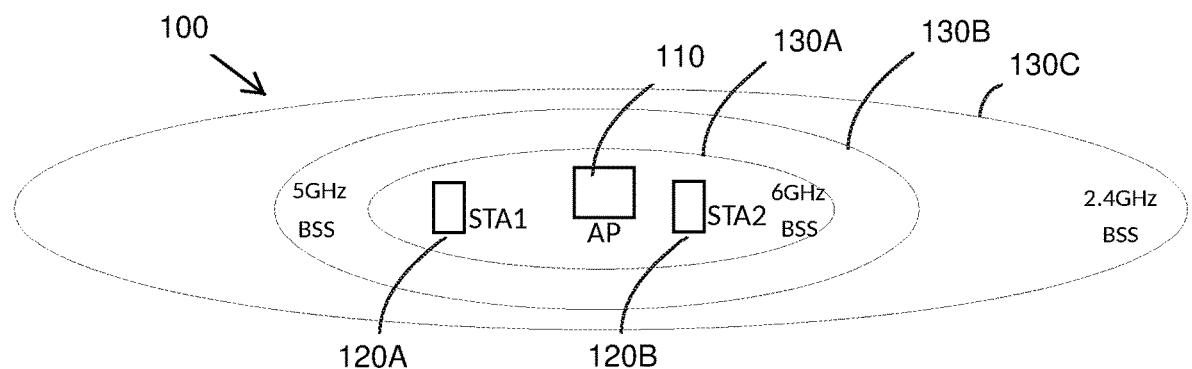
FIG. 1 shows a multi-band wireless network in which a wireless transmitter/receiver operates over multiple different frequency bands with multi-band communication devices.

Skilled artisans will appreciate that elements in the figures are illustrated for simplicity and clarity and have not necessarily been depicted to scale.

DETAILED DESCRIPTION

Multi-band communication devices are capable of transmitting and receiving data over multiple different frequency bands in a wireless network. These electronic devices have many advantages over conventional electronic devices that are capable of operating in a single frequency band. Operating multi-band communication devices in wireless networks, however, has numerous technical problems.

As one example problem, multi-band communication devices operating in a multi-band wireless network must be separately or independently discovered, authenticated, and associated in each frequency band of the wireless network. For instance, if an Access Point (AP) operates in three different frequency bands, then a multi-band communication device would have to be discovered, authenticated, and associated three different times, once for each frequency band in which the device operates. This type of discovery, authentication, and association creates unnecessary network traffic and is inefficient in its consumption of processing, memory, and network resources.

As yet another example problem, when a multi-band communication device authenticates and associates in a wireless network, the multi-band AP maintains a different association record across each frequency band for each multi-band communication device. The AP views each electronic device operating on each different frequency band as a separate electronic device. This situation requires the AP to maintain and manage large numbers of association records and is hence inefficient.

As another example problem, an AP must continuously broadcast or advertise its presence over each frequency band in which it operates. Likewise, multi-band communication devices must continuously monitor or scan for these broadcasts over the various different frequencies. Broadcasting and scanning in this manner creates unnecessary network traffic.

Other technical problems exist with operating multi-band communication devices in wireless networks. Some of these problems relate to one or more of discovery, authentication, de-authentication, association, de-association, and management of multi-band communication devices operating in the wireless network.

Example embodiments solve these and other technical problems that occur with the operation of multi-band communication devices in multi-band wireless networks.

Example embodiments include apparatus and methods that operate multi-band communication devices in multi-band wireless networks. Such apparatus and methods include electronic devices with transmitters and/or receivers that communicate over multiple different frequency bands with multi-band electronic devices in one or more wireless networks. This communication includes one or more of authenticating, associating, de-authenticating, and de-associating the multi-band electronic devices with one or more multi-band communication apparatus, such as an AP.

In an example embodiment, multi-band communication devices are discovered, authenticated, associated, de-authenticated, and/or de-associated over multiple different frequency bands via a single frequency band. Such embodiments provide improvements over conventional techniques in which a multi-band communication device would have to be discovered, authenticated, associated, de-authenticated, and de-associated separately for each different frequency band in which the multi-band communication device operates.

In an example embodiment, a multi-band AP maintains a single association record for each multi-band communication device regardless of the number of different frequency bands in which the device operates. Thus, the multi-band AP maintains a single association record for a multi-band communication device across all operating frequency bands. Such embodiments provide improvements over conventional techniques that maintain a different or unique association record across each frequency band for each multi-band communication device in which the device operates.

In an example embodiment, a multi-band AP broadcasts or advertises its availability for multiple frequency bands in a single frequency band. The multi-band AP can also broadcast or advertise for neighboring multi-band APs. This process reduces network traffic and congestion, expedites authentication and association, and provides more efficient wireless network operations.

FIG. 1 shows a multi-band wireless network 100 in which a wireless transmitter/receiver 110 operates over multiple different frequency bands with multi-band communication devices 120A and 120B. By way of example, the multi-band communication device 110 is shown as an AP, and the multi-band communication devices 120A and 120B are shown as non-AP stations (STAs) STA1 and STA2. The multiple different frequency bands include, but are not limited to, 6 GHz, 5 GHz, and 2.4 GHz. As shown, the AP 110 provides three basis service sets (BSSs) as 6 GHz (BSS) 130A, 5 GHz BSS 130B, and 2.4 GHz BSS 130C.

The AP 110 thus operates as a multi-band communication device that operates on multiple different frequency bands, as opposed to an AP capable of operating on a single frequency band with single-band devices. The AP 110 can function as an independent AP on each of the different multiple frequency bands. Furthermore, although the STAs 120A and 120B are multi-band communication devices (e.g., capable of operating on one more than one frequency band), single-band communication devices can also operate in the wireless network 100.

In an example embodiment, the AP is an Extremely High Throughput (EHT) AP, such as a Tri-band AP operating on 2.4 GHz, 5 GHz, and 6 GHz. The STAs can be single-band, dual-band, tri-band, etc. For instance, STA1 120A is a dual-band STA operating on 5 GHz and/or 6 GHz, and STA2 120B is a tri-band STA operating on 2.4 GHz, 5 GHz, and 6 GHz. The EHT AP sets up BSSs in multiple frequency bands (e.g., 2.4 GHz, 5 GHz, and 6 GHz) as separate BSSs.

Consider an example embodiment in which the wireless network is a Wireless Local Area Network (WLAN) operating per IEEE 802.11 that improves in peak throughput and multi-band transmission. The 2.4 GHz BSS 130C and 5 GHz BSS 130B transmit independent Beacon frames (e.g., at 100 ms intervals or another interval) and allow active and/or passive scanning to discover the AP 110. Operation in the 6 GHz BSS 130A, however, is restricted in order to reduce management and/or control traffic (e.g., pre-association frame exchanges). Beacon frames in 6 GHz BSS 130A may not be transmitted at all or transmitted at a much lower frequency (e.g., once a second or another interval). Active scanning by sending Probe Request frames may be disallowed in 6 GHz BSS 130A. Instead, the 2.4 GHz band functions to advertise the presences of the AP 110 operating in 6 GHz. In this example, STAs receive basic information (e.g., Operating channel, MAC address, etc.) about APs in the 6 GHz band through Beacon frames and/or Probe Response frames in the 2.4 GHz and/or 5 GHz bands.

In this example embodiment, after receiving basic information of co-located APs in another frequency band, a multi-band capable STA may gather more information (e.g., band specific capabilities, etc.) about the APs by performing active/passive scanning or exchanging Probe Requests/Responses with co-located APs.

First, the non-AP STA can perform active and/or passive scans on the indicated band (in this example, 6 GHz). In this case, a non-AP STA can judge the quality of the connection link on that band based on the received frames (e.g., Beacon frame or Probe Response frame).

Second, the non-AP STA can exchange Probe Requests and/or Response frames with the co-located APs on the other band using, for example, On-Channel Tunneling (OCT). OCT allows management frames addressed to the MAC sublayer management entity (MLME) of a AP/STA on a second band to be tunneled on a first band using the On-Channel Tunnel Request frame. In this case, since the actual frame exchange takes place on one band, a non-AP STA may not be able to judge the quality of the connection link on the other bands. This may be an issue especially if the lower frequency bands (2.4 GHz or 5 GHz) are used to discover the higher frequency bands (5 GHz or 6 GHz) since the transmission range is generally smaller in the higher frequency bands.

For example, a non-AP STA may discover a multi-band AP using OCT on the 2.4 GHz, but it may not be sure whether the AP can be reached on the other bands. In such event, the non-AP STA may include a Transmit Power Control (TPC) Request element in the Probe Request frame to request the AP to include a TPC Report element in the Probe Response frame. Based on the transmit power value reported in the TPC Report element as well as the actual received power at which the Probe Response frame was received, the non-AP STA can roughly calculate the quality of the connection link on the other bands.

Based on the band specific information obtained as explained above as well as the link quality, the non-AP STA can decide the frequency bands to initiate the multi-band connection as explained herein. As for support of legacy devices, all EHT APs are also expected to support legacy 802.11 STAs (HT (11*n*), VHT (11*ac*), HE (11*ax*)) and hence are expected to support the respective functionalities. Since most, if not all, legacy non-AP STAs are single band devices, an EHT AP will also appear and act as a single band HE, VHT or HE AP on each of the respective bands.

Figure 2:
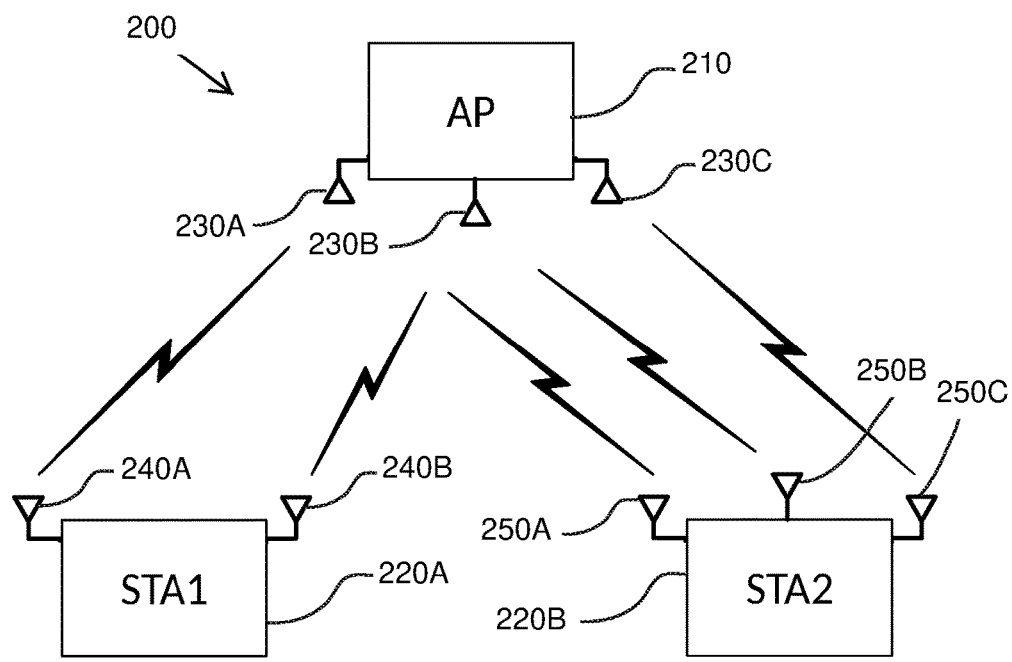
FIG. 2 shows a multi-band wireless network in which a wireless transmitter/receiver operates over multiple different frequency bands with multi-band communication devices.

FIG. 2 shows a multi-band wireless network 200 in which a multi-band communication device with a wireless transmitter/receiver 210 operates over multiple different frequency bands with multi-band communication devices 220A and 220B. By way of example, the multi-band communication device 110 is shown as an AP with three antennas 230A, 230B, and 230C. The multi-band communication devices are shown as STA1 with two antennas 240A and 240B and STA2 with three antennas 250A, 250B, and 250C. Although multi-band capable APs are fairly common, multi-band capable STAs are not so common and even the few STAs that operate on multiple bands typically only communicate on one frequency band at a time. Concurrent communication (either transmit or receive or both) on multiple channels on different frequency bands may be referred to as Multi-band communication and is an effective means of dramatically increasing the transmission throughput.

Consider an example in which AP 210 is a Tri-band capable AP (2.4 GHz, 5 GHz, and 6 GHz); STA1 220A is a dual-band capable STA (5 GHz and 6 GHz); and STA2 220B is a Tri-band capable STA (2.4 GHz, 5 GHz, and 6 GHz). The AP 210 may engage in multi-band communication with STA1 220A over the 5 GHz and 6 GHz bands, while AP 210 may engage in multi-band communication with STA2 220B over the 2.4 GHz, 5 GHz and 6 GHz bands.

Figure 3:
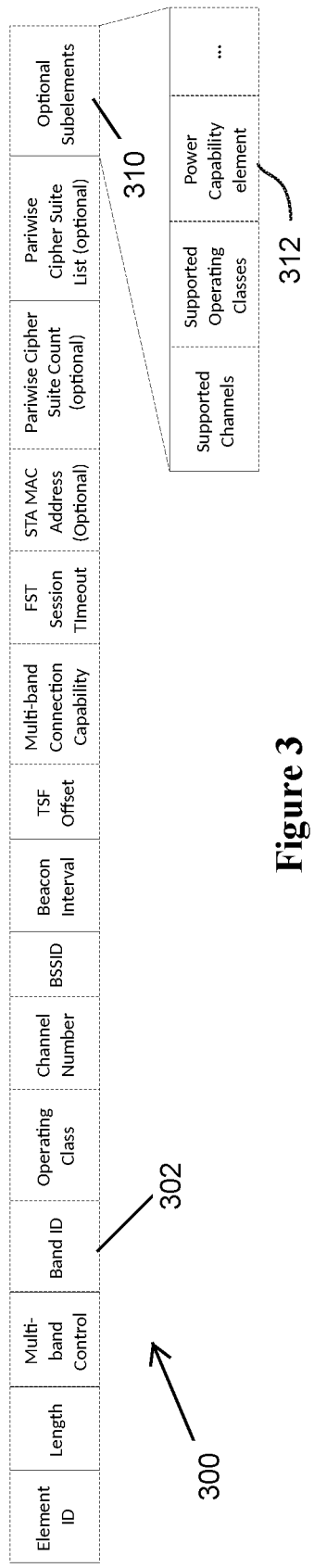
FIG. 3 is an element that advertises multi-band capability.

FIG. 3 is an element 300 that advertises multi-band capability. By way of example, the element 300 may be a multi-band element and includes one or more of Element ID, Length, Multi-band Control, Band ID, Operating Class, Channel Number, Basic Service Set Identifier (BSSID), Beacon Interval, TSF Offset, Multi-band Connection Capability, Fast Session Transfer (FST) Session Timeout, STA MAC Address, Pairwise Cipher Suite Count, Pairwise Cipher Suite List, and Option Sub-elements (e.g., Supported Channels, Supported Operating Classes, Power Capability Element, etc.).

Consider an example in which the AP broadcasts or advertises that it is a multi-band capable AP by including the multi-band element 300 in one or more of Beacon frames and Probe Response frames. For instance, the frames may include one or more multi-band element, one element for each band (aside from the band on which the Beacon/Probe frame is transmitted) as identified by the Band ID field 302 on which the AP also operates a BSS. For instance, the multi-band element includes optional elements 310 that provide additional band specific information required for operation on the band identified by the Band ID field 302 (e.g., capabilities, operation element, EDCA parameter set, Supported rates and BSS membership selectors, Extended Supported rates and BSS membership selectors, etc.). For instance, the Power Capability Element 312 indicates its transmit power capabilities in the band.

Figure 4:
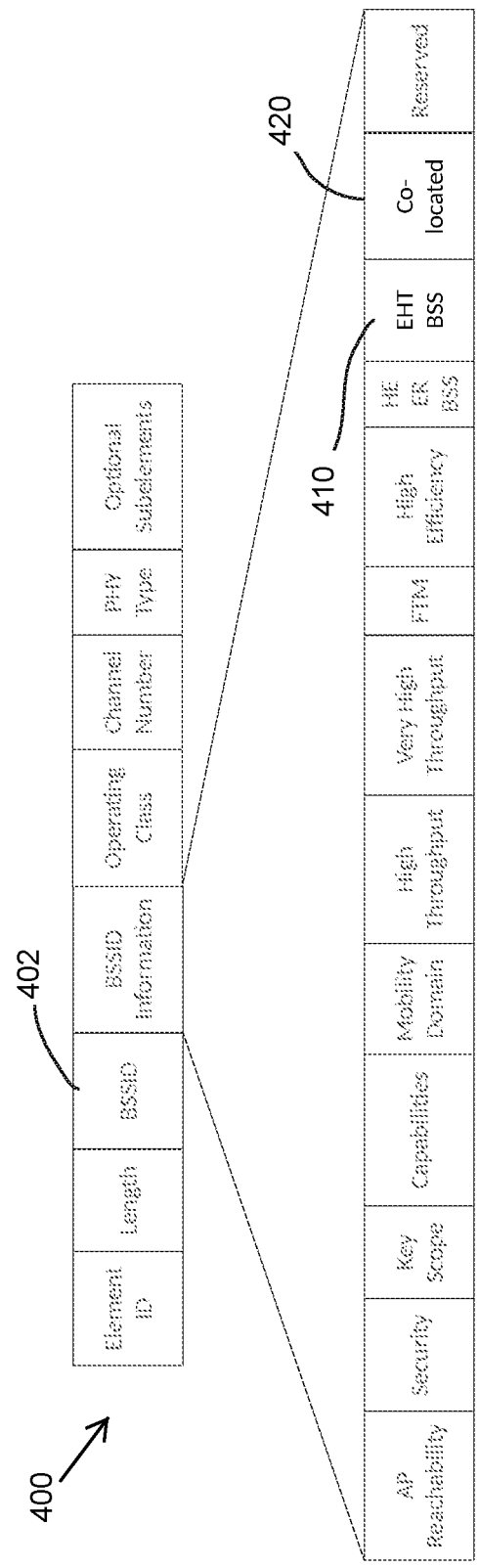
FIG. 4 is an element that advertises multi-band capabilities of neighbor APs.

FIG. 4 is an element 400 that advertises multi-band capabilities of neighbor APs. By way of example, the element 400 includes one or more of Element ID, Length, BSSID, BSSID Information, Operating Class, Channel Number, PHY Type, and Optional Elements. The BSSID Information 402 includes one or more of AP Reachability, Security, Key Scope, Capabilities, Mobility Domain, High Throughput, Very High Throughput, FTM, High Efficiency, HE ER BSS, EHT BSS, Co-located, and Reserved.

Consider an example in which the AP transmits the frame 400 to advertise multi-band capable neighbor EHT APs (that also include co-located APs). For instance, the AP uses Neighbor Report element. For instance, per element 410, an EHT BSS bit identifies that this is an EHT BSS. Per element 420, a co-located BSS bit is added to identify that the AP being advertised is co-located with the AP that is transmitting the Neighbor Report element. The Operating Class field and Channel Number field together implicitly identify the frequency band.

Alternatively, the AP may also use the Reduced Neighbor Report element to advertise multi-band capable neighbor EHT APs. A reserved bit in the TBTT Information Header subfield may be used to identify that the AP being advertised is co-located with the AP that is transmitting the Reduced Neighbor Report element. The Operating Class field and Channel Number field together implicitly identify the frequency band.

Figure 5:
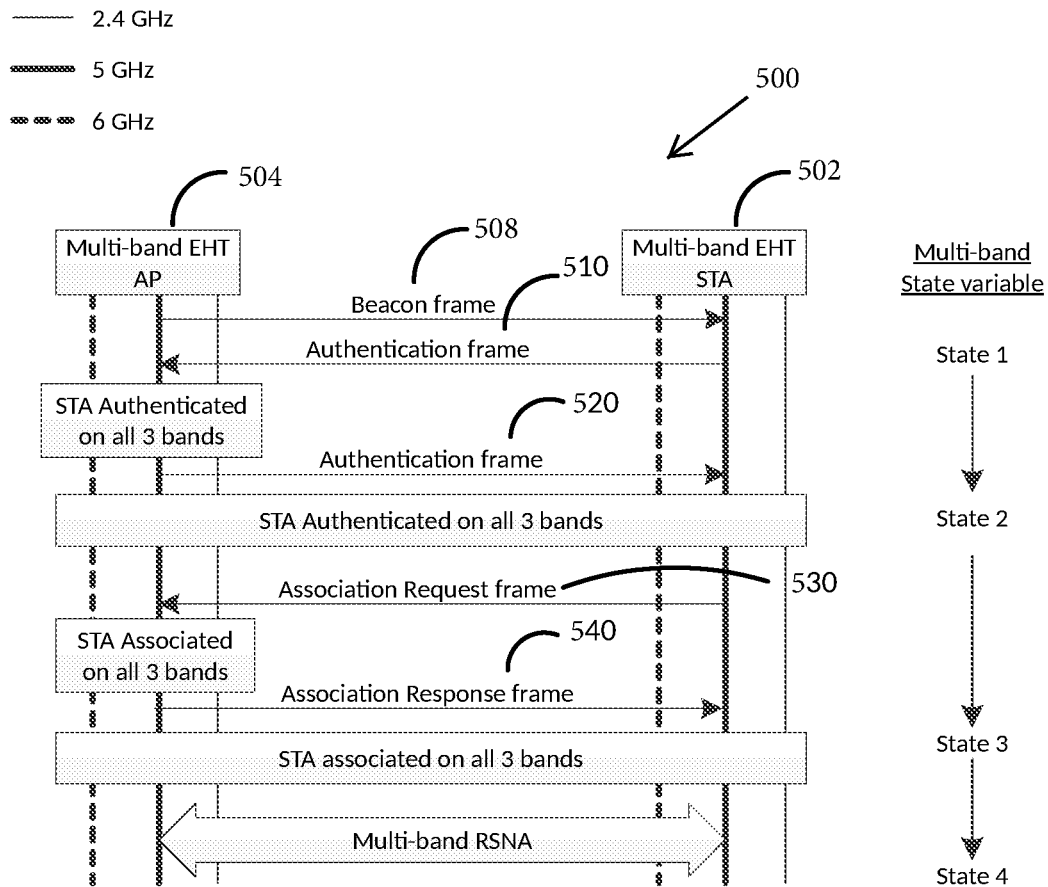
FIG. 5 is a flow diagram showing a non-AP STA being authenticated and/or associated with all BSSs of a co-located EHT AP using a single Authentication frame and/or Association frame exchange on any one frequency band in which the AP operates.

FIG. 5 is a flow diagram 500 showing a non-AP STA 502 being authenticated and/or associated with all BSSs of a co-located EHT AP 504 using a single Authentication frame and/or Association frame exchange on any one frequency band in which the AP operates. For illustration, the STA 502 is authenticated and/or associated across three frequency bands of 2.4 GHz, 5 GHz, and 6 GHz. As an example the EHT AP 504 may be the AP 200 and the non-AP STA 502 may be the STA2 220B.

Consider an example in which in order to communicate across multiple bands, the non-AP STA 502 is required to be authenticated and/or associated on all applicable frequency bands. The AP 504 broadcasts a Beacon frame 508 on the 5 GHz band, through which STA 502, currently operating on the 5 GHz band, discovers the multi-band capability of the AP, for example by checking the included multi-band elements 300, and decides to get authenticated on all the frequency bands (2.4 GHz, 5 GHz, and 6 GHz) on which the AP 504 operates and also decides the frequencies to be associated on, in this example being all three bands (2.4 GHz, 5 GHz, and 6 GHz). The STA 502, transmits an Authentication frame 510 on the 5 GHz band requesting the AP 504 to authenticate the STA on the 5 GHz band as well as the 2.4 GHz and the 6 GHz bands. Based on this transmission (which occurred in this example on 5 GHz), the AP authenticates the STA on all three bands (2.4 GHz, 5 GHz, and 6 GHz) and transmits Authentication frame 520 to STA 502 to acknowledge a successful Authentication.

The STA 502 then transmits an Association Request frame 530 to the AP 504 on the 5 GHz band requesting the AP 504 to associate the STA on the 5 GHz band as well as the 2.4 GHz and the 6 GHz bands. Based on this transmission (which occurred in this example on 5 GHz), the AP associates the STA on all three bands (2.4 GHz, 5 GHz, and 6 GHz), and responds back with Association Response frame 540 to acknowledge a successful Association.

FIG. 5 shows an improvement over conventional techniques for authentication and/or association of multi-band APs and multi-band STAs. For example, in conventional 802.11 WLANs, a STA is required to authenticate/associate on the BSSs on each frequency band independent of the other bands. This conventional technique requires and/or involves exchanging Authentication/Association frames on each band, maintaining a concurrent multi-band AP operating on multiple bands, and keeping separate Association records (Association state variable, Association ID (AID), Security Keys etc.) for each associated STA on different bands.

In contrast to this conventional technique, an example embodiment provides multi-band operations that are simplified by the AP maintaining a single Association instance for a multi-band capable STA. The AP maintains this single Association instance regardless of the band used for Association. Instead of treating a multi-band STA as independent entities on different frequency bands, an EHT AP in an example embodiment treats a multi-band STA as a single entity that may operate across multiple frequency bands.

Although the process 500 involves Authentication, Association as well as Security setups, for simplicity the entire process 500 may be termed as a multi-band connection. Although not shown in the figure, the multi-band operation is also applicable to the reverse operation of Deauthentication/Disassociation. The AP may deauthenticate/disassociate a multi-band STA on multiple bands by sending a single Deauthentication/Disassociation frame respectively on any active band.

FIG. 6 is a frame 600 for authenticating and/or associating multi-band STAs across multiple different frequency bands. By way of example, the frame 600 includes a MAC Header 610 with one or more of Frame Control, Duration, Address 1, Address 2, Address 3, Sequence Control, HT Control and a frame body 620 with one or more of Multi-band Element 630 (which may be the element 300 in FIG. 3), EHT Options element 640, and FCS. The EHT Options element includes one or more of Element ID, Length, Element ID Extension, and EHT Control Bitmap 650 which includes Multi-band Authentication, Multi-band Association, and Reserved.

The Multi-band element 630 indicates additional frequency band specific information used for multi-band Authentication and/or Association. The EHT Control Bitmap 650 indicates whether the multi-band Authentication and/or Association is requested for the indicated bands (in the Multi-band Element 630).

In an example embodiment, authentication, association, de-authentication, disassociation, and/or re-association frames share similar frame formats. Aside from the frequency band on which the frame is transmitted, additional bands to be authenticated, associated, re-associated, de-authenticated, and/or disassociated are indicated by including one or more multi-band elements 630 in the respective frame, each element identifying one band. The optional sub-element field (e.g., FIG. 3 at 310) carries additional sub-element(s) that are required to authenticate and/or associate on the band indicated by the Band ID field (e.g., FIG. 3 at 302) of the multi-band element. Some common parameters may be indicated by the other fields in the frame (e.g., HT/VHT/HE operation/capabilities elements, etc.). Since many parameters may be specific to a particular frequency band (e.g., supported MCS rates, number of supported spatial streams, EDCA parameters), if any of the common parameters are different, the band specific parameters can also be included in the multi-band element.

In Authentication frame 510 and Association Request frame 520 of FIG. 5, a non-AP STA may also include the Power Capability element (e.g., FIG. 3 at 312) to indicate its transmit power capabilities in the band. The AP may make use of such band specific information to decide whether or not to allow the non-AP STA on any particular band.

Although the multi-band connection per process 500 in FIG. 5 shows an example of a successful Authentication/Association on all three frequency bands, it may also be possible that Authentication/Association is successful on some bands while unsuccessful on other bands. The AP can indicate the bands on which Authentication/Association was successful by including the Multi-band element of that band in the Authentication frame 520 and the Association Response frames 540.

FIG. 7 is an example Association Record 700 maintained by a multi-band EHT AP. The record includes one or more of STA AID, Association State, 2.4 GHz MAC Address, 5 GHz MAC Address, 6 GHz MAC Address, Private Cipher Key, and Group Cipher Key. The record includes example data in some of these fields for two stations STA1 and STA2.

Since the STA may use different MAC addresses to communicate on the channels on different frequency bands, the AP also keeps a record of the STA's band specific MAC addresses (for example extracted from the multi-band element). Row 1 of the record may refer to STA1's record while row 2 may refer to STA2's records.

Although not listed in the record, the AP may also maintain other band specific parameters for each STA (e.g., Supported rates, EDCA Parameter set, etc.). As for legacy non-AP STAs (11n, 11ac, 11ax devices) that are single band devices, an EHT AP will continue to support single band authentication/association as per baseline rules. The EHT AP may choose to use the same Association record 700 for such devices as well, or it may choose to maintain a separate record for associated single band devices. In order to simplify operations across different bands, the AP may choose to maintain a unified AID assignment scheme that assigns AIDs to associated devices irrespective of the bands that they are associated on. Further, AIDs are not re-used across different bands to simplify AID management.

Figure 8:
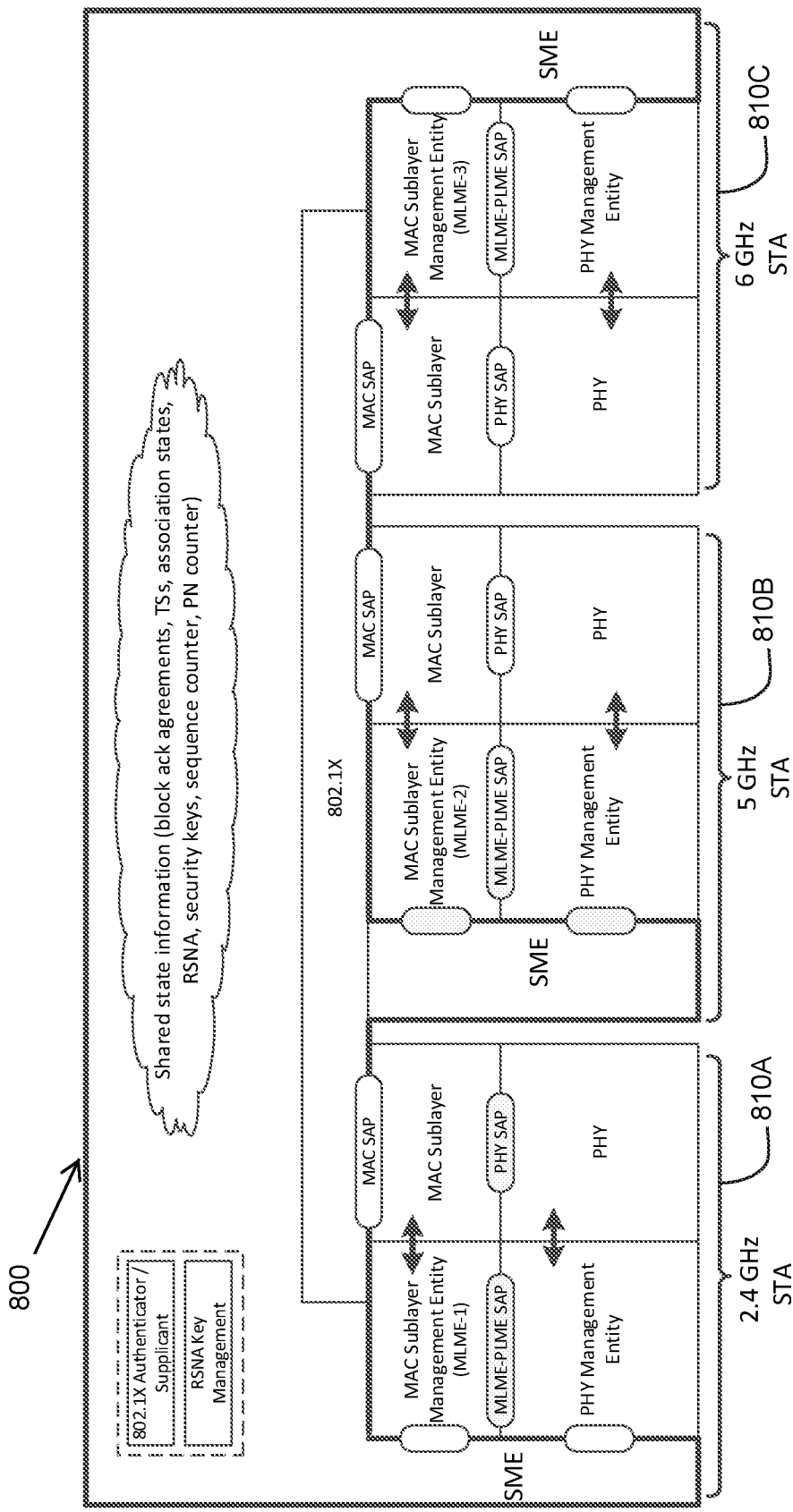
FIG. 8 is a reference model of a tri-band capable EHT AP and/or STA.

FIG. 8 is a reference model of a tri-band capable EHT AP and/or STA 800. For illustration, the AP/STA 800 operates in multiple frequency bands, including 2.4 GHz, 5 GHz, and 6 GHz. As such, the AP/STA 800 includes three separate STAs 810A, 810B, and 810C, one for each frequency band.

As shown, each STA includes one or more of Physical layer (PHY), MAC Sublayer, PHY Management Entity (PLME), and MAC Sublayer Management Entity (MLME) for each frequency band, while a common Station Management Entity (SME) is responsible for managing the PHY and MAC layers on all three bands.

In an example embodiment, a single Station Management entity has access to the MAC and PHY layers of each band through the respective MAC Layer Management Entity (MLME) and PHY Management Entity (PLME). The MAC Service Access Points (SAP) of each STA provides the upper layer protocols with the interface to the band specific MAC and PHY sublayers.

As shown in FIG. 8, shared state information includes one or more of block ack agreements, TSs, association states, RSNA, security keys, sequence counter, and PN counter.

Figure 9:
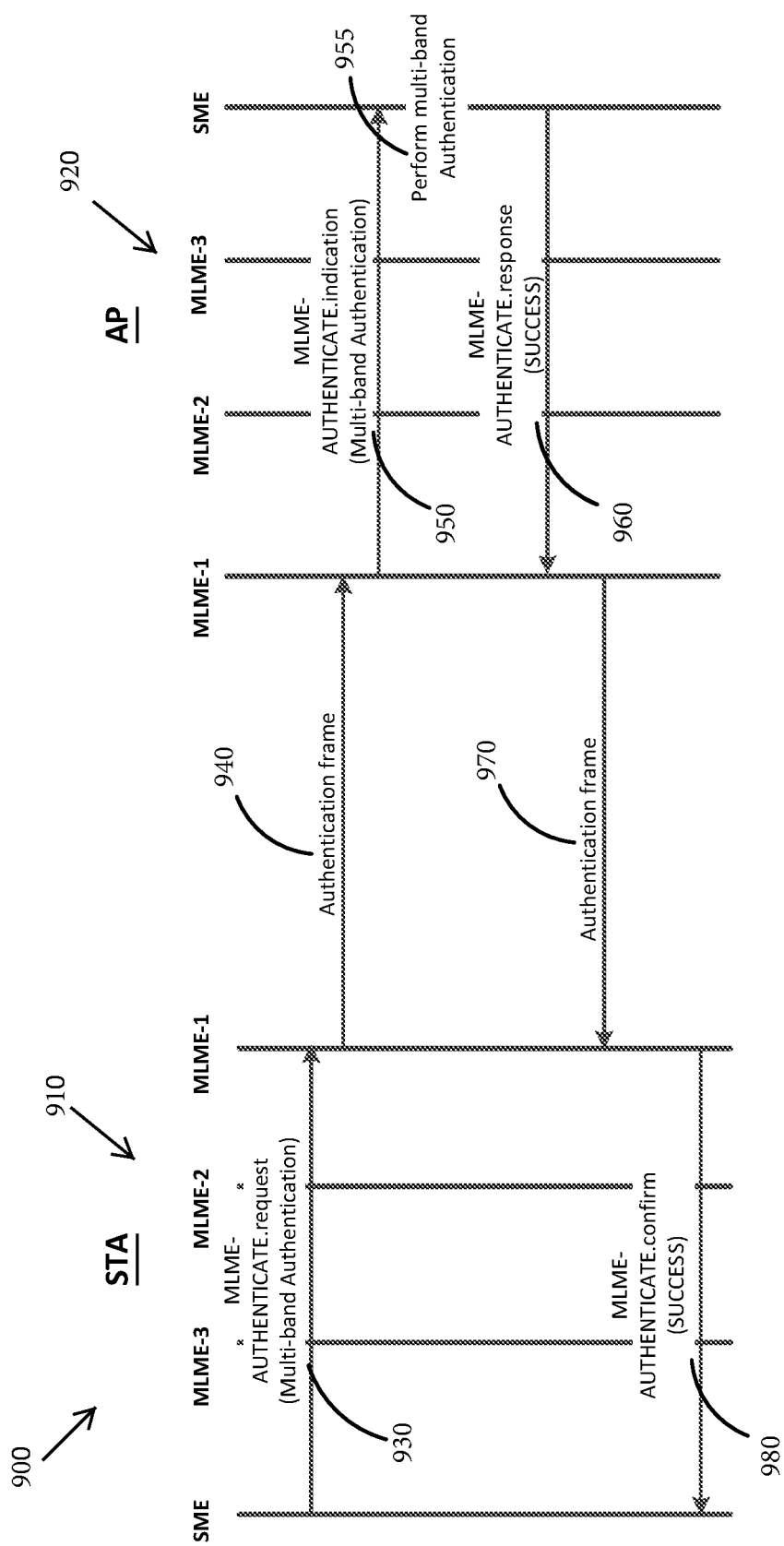
FIG. 9 shows a process for primitives and frame exchange involved in a multi-band Authentication between a STA and an AP.

FIG. 9 shows a process 900 for primitives and frame exchange involved in a multi-band Authentication between a STA 910 and an AP 920.

For process 900, a Multi-band Authentication flag in the MLME-AUTHENTICATE primitives may be used to differentiate the multi-band Authentication primitives from the regular single band Authentication. The SME of a non-AP STA 910 initiates a multi-band Authentication by issuing the MLME-AUTHENTICATE.request primitive 930 (with the Multi-band Authentication flag set) to the MLME of any of the active frequency bands, which in turn triggers an Authentication frame 940 (which may be the Authentication frame 510 in FIG. 5) to be transmitted on the operational channel on that frequency band. Upon reception of the Authentication frame 940, the AP's MLME of that band generates the MLME-AUTHENTICATE.indication primitive 950 (with the Multi-band Authentication flag set and also indicates the additional frequency bands on which authentication is requested). When the SME of an AP receives a MLME-AUTHENTICATE.indication primitive 950 that has the Multi-band Authentication flag set, the AP performs a multi-band Authentication 955 and authenticates the STA on the frequency band on which the Authentication frame 940 was received, as well as all the other bands indicated by the Multi-band elements carried in the Authentication frame 940. Upon successful completion of the multi-band Authentication, the SME of the AP confirms a successful multi-band Authentication by issuing the MLME-AUTHENTICATE.response primitive 960 (with the status code set SUCCESS) to the MLME of the frequency band on which the Authentication frame 940 was received, which in turn triggers an Authentication frame 970 (which may be the Authentication frame 520 in FIG. 5) to be transmitted on the operational channel on that frequency band. Upon reception of the Authentication frame 970, the non-AP STA's MLME of that band generates the MLME-AUTHENTICATE.confirm primitive 980 to indicate a successful multi-band Authentication.

Figure 10:
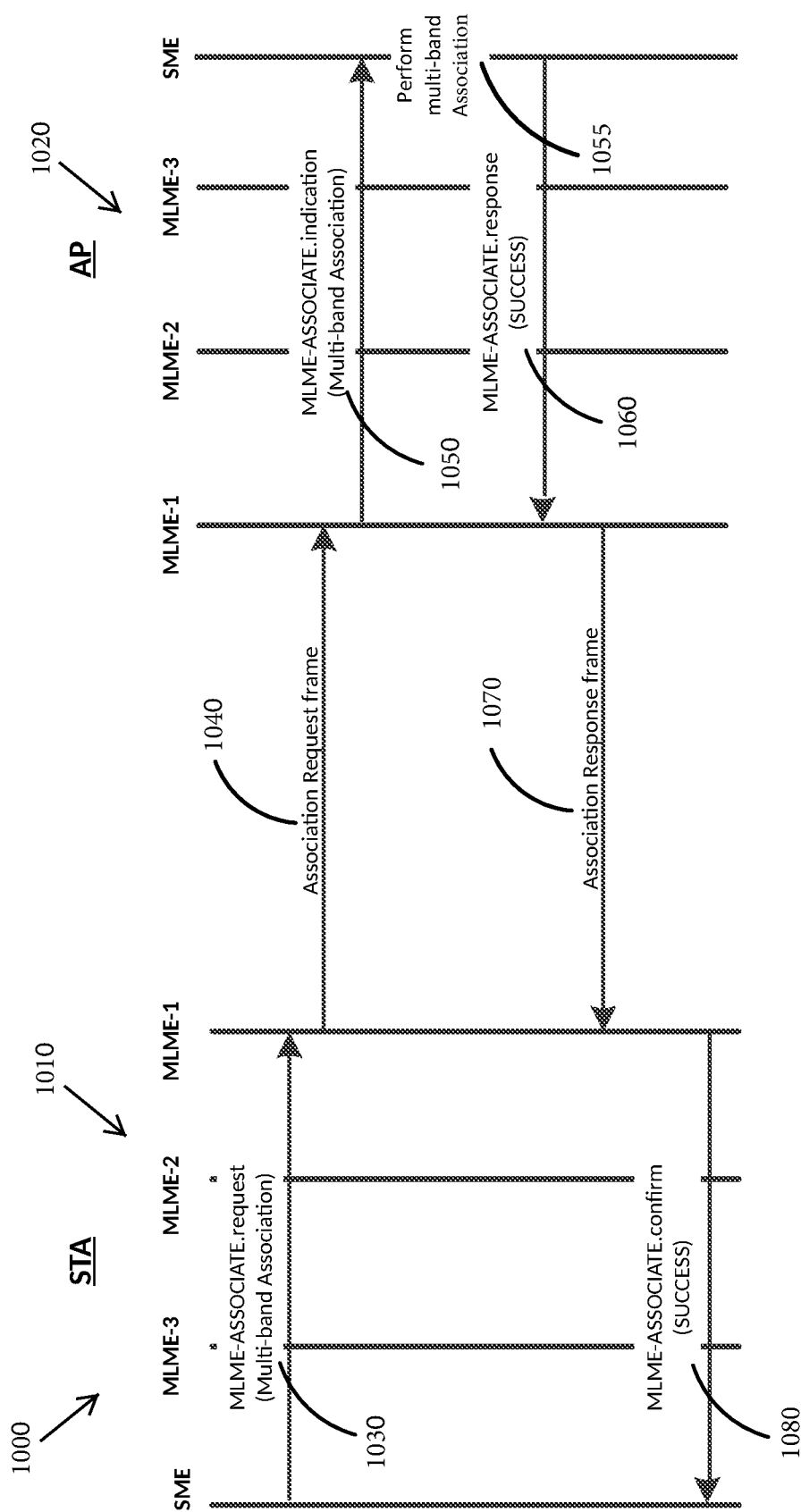
FIG. 10 shows a process for primitives and frame exchange involved in a multi-band Association between a STA and an AP.

FIG. 10 shows a process 1000 for primitives and frame exchange involved in a multi-band Association between a STA 1010 and an AP 1020.

For process 1000, a Multi-band Association flag in the MLME-ASSOCIATE primitives may be used to differentiate the multi-band Association primitives from the regular (single band) Association. The SME of a non-AP STA 1010 initiates a multi-band Association by issuing the MLME-ASSOCIATE.request primitive 1030 (with the Multi-band Association flag set and also indicates the additional frequency bands on which association is requested) to the MLME of any of the active frequency bands, which in turn triggers an Association Request frame 1040 (which may be the Association Request frame 530 in FIG. 5) to be transmitted on the operational channel on that frequency band. Upon reception of the Association frame 1040, the AP's MLME of that band generates the MLME-ASSOCI-ATE.indication primitive 1050 (with the Multi-band Association flag set and also indicates the additional frequency bands on which association is requested). When the SME of an AP receives a MLME-ASSOCIATE.indication primitive 1050 that has the Multi-band Association flag set, the AP performs a multi-band Association 1055 and associates the STA on the frequency band on which the Association frame 1040 was received, as well as all the other bands indicated by the Multi-band elements carried in the Association frame 1040. Upon successful completion of the multi-band Association, the SME of the AP confirms a successful multi-band Association by issuing the MLME-ASSOCIATION.response primitive 1060 (with the status code set SUCCESS) to the MLME of the frequency band on which the Association frame 1040 was received, which in turn triggers an Association frame 1070 (which may be the Association Response frame 540 in FIG. 5) to be transmitted on the operational channel on that frequency band. Upon reception of the Association frame 1070, the non-AP STA's MLME of that band generates the MLME-ASSOCIATION.confirm primitive 1080 to indicate a successful multi-band Association. Although not shown in the FIG. 9 or 10, the multi-band operation is also applicable to the MLME-DEAUTHENTICATE/MLME-DISASSOCIATE primitives used for the reverse operation of Deauthentication/Disassociation. The AP may deauthenticate/disassociate a multi-band STA on multiple bands by sending a single Deauthentication/Disassociation frame respectively on any active band.

Figure 11:
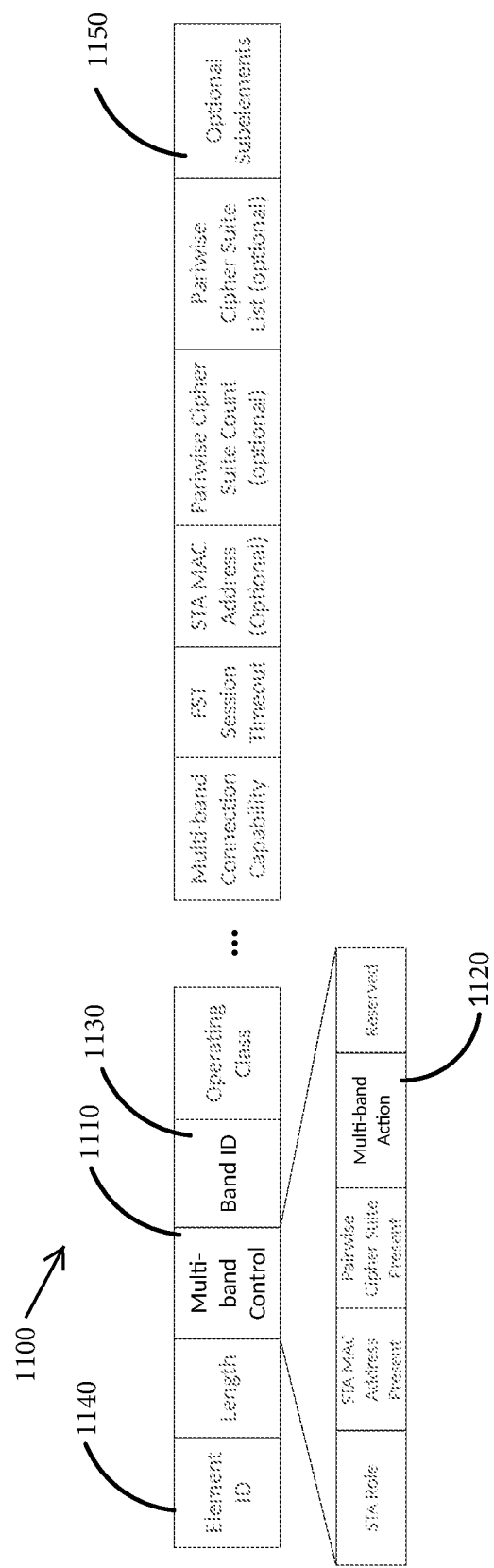
FIG. 11 shows an element used to authenticate and/or associate a multi-band STA with an multi-band AP.

FIG. 11 shows an element 1100 used to authenticate and/or associate a multi-band STA with a multi-band AP. By way of example, the element 110 may be the Multi-band element 300 and includes Element ID, Length, Multi-band Control, Band ID, Operating Class, Channel Number (not shown), BSSID (not shown), Beacon Interval (not shown), TSF Offset (not shown), Multi-band Connection Capability, FST Session Timeout, STA MAC Address (Optional), Pairwise Cipher Suite Count (Optional), Pairwise Cipher Suite List (Optional®), and Optional Elements. The Multi-band Control 1110 further includes a STA Role, STA MAC Address Present, Pairwise Cipher Suite Present, Multi-band Action, and Reserved.

Instead of using the EHT Control Options element 640 in the Authentication/Association frames as shown in FIG. 6, a STA or AP may also use the "Multi-band Action" bit 1120 in the Multi-band Control field 1110 of the Multi-band element to indicate that the frame carrying the Multi-band element is part of a multi-band Authentication or Association with respect to the band indicated by the Band ID field 1130. The "Multi-band Action" bit 1120 indicates a multi-band Authentication when the multi-band element 1140 is carried in an Authentication frame, and indicates a multi-band Association when the multi-band element 1140 is carried in an Association Request frame or an Association Response frame and so on.

The optional subelement field 1150 carries additional subelements that are required to authenticate/associate on the band indicated by the Band Id field of the multi-band element.

FIG. 12 is table 1200 of 2.4 GHz association records for a STA. The table includes STA AID, Association State, MAC Address, Pairwise Cipher Key, and Group Cipher Key. Example data is provided for STA2.

FIG. 13 is table 1300 of 5 GHz association records for two stations, STA1 and STA2. The table includes STA AID, Association State, MAC Address, Pairwise Cipher Key, and Group Cipher Key. Example data is provided for STA1 and STA2.

FIG. 14 is table 1400 of 6 GHz association records for two stations, STA1 and STA2. The table includes STA AID, Association State, MAC Address, Pairwise Cipher Key, and Group Cipher Key. Example data is provided for STA1 and STA2.

FIG. 15 is a table 1500 showing example STA AID data for two stations (STA1 and STA2) for 2.4 GHz AID, 5 GHz AID, and 6 GHz AID.

In the Multi-band connection 500 in FIG. 5, it was assumed that the multi-band STA 502 was not associated on any bands with the multi-band AP 504 when it initiates the Multi-band connection 500. However, it is also possible that the STA is already associated with the AP on at least one band, e.g. the 5 GHz band. During or after the association process on the 5 GHz band, it discovers the multi-band capabilities of the AP and decides to also associate on the other bands so as to be able to make use of multi-band communication. Or, it may also be possible that initially, it was only in range of the 5 GHz band but outside the coverage of the 6 GHz band and subsequently, due to mobility, it came in coverage of the 6 GHz band as well. In such cases, the Multi-band connection 500 may also refer to new authentication/association on the other additional bands aside from the band in which the STA is already associated. If such a dynamic addition of association on different bands were to be enabled, it would mean that the Association State of a STA maintained by the AP may have different states in different bands and as such it may be more efficient for the AP to maintain separate Association Instances for the different bands. In an example embodiment and per FIGS. 12-15, the AP maintains separate Association Instances, one per frequency band: Band specific state variable, AID, Security association, etc. As an example STA 502 may have initially associated with the AP 504 on the 5 GHz band using the baseline (single-band) Association procedure. Subsequently, it decides to initiate the Multi-band connection 500 to "join" the 2.4 band and 6 GHz bands. After completing the Multi-band Authentication, the Association records for STA 502 may look like shown in row 1210 for the 2.4 GHz band and row 1410 for the 6 GHz band (Association State 2 indicates that STA 502 is successfully authenticated). In order to keep track of the STAs parameters in different bands, the AP may also maintain the table 1500 listing the multi-band STAs ID (e.g. AID) in different bands and use it to cross reference the respective Association Records in each band for band specific parameters. Subsequently, after successfully completing Multi-band Association on 2.4 GHz and 6 GHz bands, the Association records for STA 502 (rows 1210 and 1410) will be updated to reflect the new Association State (4) and the assigned AIDs. Similarly, table 1500 will also be updated with the assigned AIDs in the 2.4 GHz and 6 GHz bands.

Figure 16:
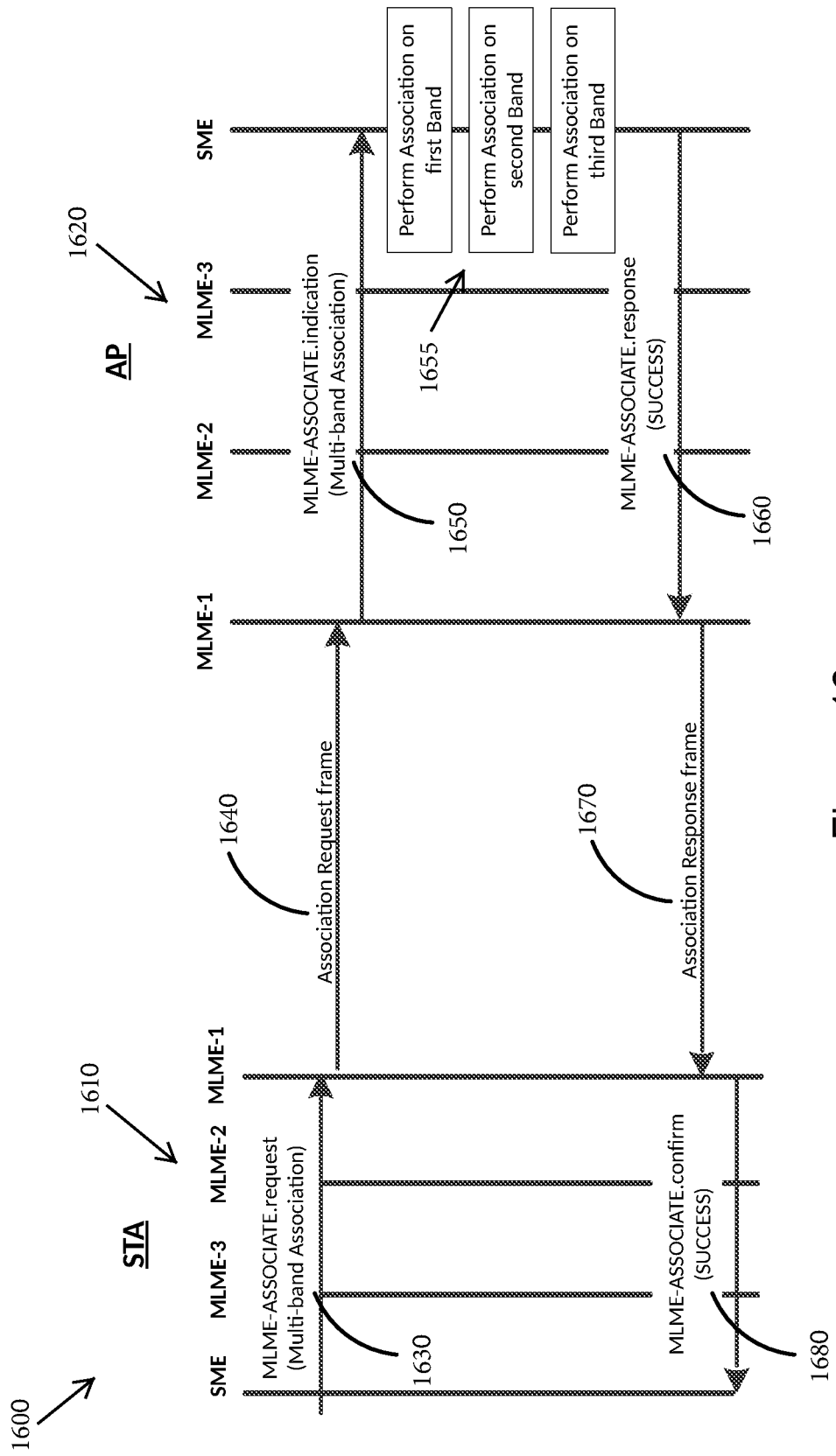
FIG. 16 shows a process for primitives and frame exchange involved in a multi-band Association between a STA and an AP.

FIG. 16 shows a process 1600 for primitives and frame exchange involved in a multi-band Association between a STA 1610 and an AP 1620. Association is performed on each applicable frequency band, and the AP maintains a separate Association Instance for each band. The AP may deauthenticate and/or disassociate a multi-band STA on multiple bands by sending a single Deauthentication frame and/or Disassociation frame respectively on any active band, or deauthenticate and/or disassociate may be performed on individual bands independent of other bands.

For process 1600, a Multi-band Association flag in the MLME-ASSOCIATE primitives may be used to differentiate the multi-band Association primitives from the regular (single band) Association. The SME of a non-AP STA 1610 initiates a multi-band Association by issuing the MLME-ASSOCIATE.request primitive 1630 (with the Multi-band Association flag set) to the MLME of any of the active frequency bands, which in turn triggers an Association Request frame 1640 to be transmitted on the operational channel on that frequency band. Upon reception of the Association Request frame 1640, the AP's MLME of that band generates the MLME-ASSOCIATE.indication primitive 1650. When the SME of an AP receives a MLME-ASSOCIATE.indication primitive 1650 that has the Multi-band Association flag set, the AP performs a multi-band Association 1655 by performing or executing association on the first band, association on the second band, and association on the third band. Upon successful completion of the multi-band Association, the SME of the AP confirms a successful multi-band Association by issuing the MLME-ASSOCIATION.response primitive 1660 (with the status code set SUCCESS) to the MLME of the frequency band on which the Association frame 1640 was received, which in turn triggers an Association Response frame 1670 to be transmitted on the operational channel on that frequency band. Upon reception of the Association Response frame 1670, the non-AP STA's MLME of that band generates the MLME-ASSOCIATION.confirm primitive 1680 to indicate a successful multi-band Association.

Figure 17:
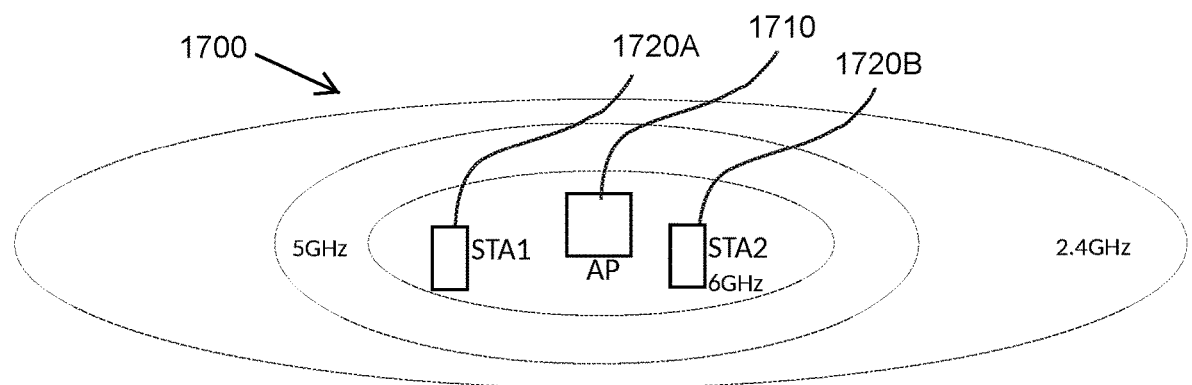
FIG. 17 shows a wireless network in which an AP sets up a single unified BSS on multiple different frequency bands.

Instead of maintaining separate BSSs on different frequency bands, BSS operations may be simplified by maintaining a single BSS across all the operating frequency band of an AP. FIG. 17 shows a wireless network 1700 in which an AP 1710 sets up a single unified BSS on multiple different frequency bands for multiple STAs, shown as STA1 1720A and STA2 1720B. For illustration, the wireless network 1700 includes three frequency bands of 2.4 GHz, 5 GHz, and 6 GHz.

In an example embodiment, regardless of the number of supported sub-7 GHz frequency bands, an EHT AP sets up a single unified BSSs on all the bands. For example, FIG. 17 represents a single multi-band BSS that concurrently operates on the 2.4 GHz, 5 GHz and the 6 GHz frequency bands. An EHT AP (such as AP 1710) transmits Beacon frames on some or all of its operating bands. All the Beacons frames and/or Probe Response frames point to the same BSS without regard to the frequency band on which the frames are transmitted. A single BSSID is used to represent the unified BSS in the applicable frequency bands. The AP 1710 can use the MAC Address of any one of its sub-7 GHz wireless interfaces as the BSSID.

Figure 18:
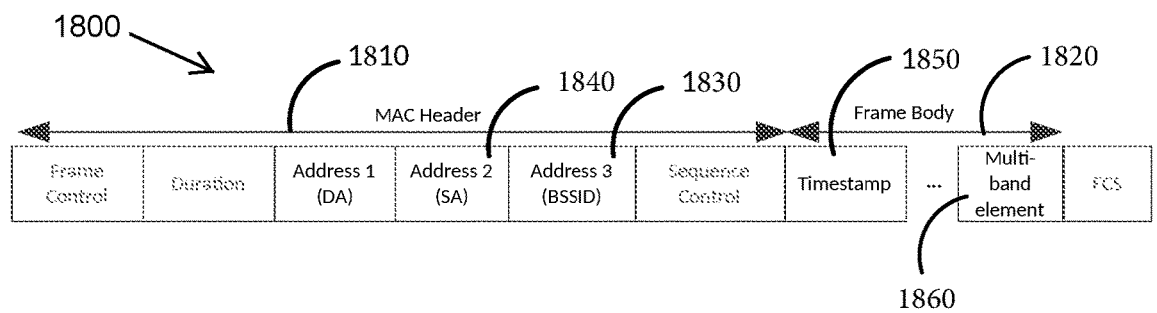
FIG. 18 is a Beacon and/or Probe Response frame used to advertise a multi-band BSS.

FIG. 18 is a Beacon and/or Probe Response frame 1800 used to advertise a multi-band BSS. The frame 1800 includes a MAC Header 1810 and Frame Body 1820. The MAC Header includes Frame Control, Duration, Address 1 (DA), Address 2 (SA), Address 3 (BSSID), Sequence Control, a Frame Body and FCS. The Frame Body 1820 includes, among other fields a Timestamp field and one or more Multi-band Elements.

Regardless of the frequency band used to transmit the Beacon frame and/or Probe Response frames 1800, the Address 3 field 1830 is set to the BSSID that represents the multi-band BSS. Address 2 1840 carries the Source Address and may be set to the hardware MAC address of the wireless interface of the frequency band on which the frame is transmitted.

To simplify operation across the various bands, the AP may choose to maintain a single clock for timing purpose. In this case, the Timestamp field 1850 carries the unified Timing Synchronization Function (TSF) value.

The AP advertises that it is multi-band capable in Beacon frame and/or Probe Response frame. For example, the frame

1800 includes one or more Multi-band element 1860, one element for each band (aside from the band on which the Beacon/probe frame is transmitted) as identified by the Band ID field on which the AP also operates. Although not shown in FIG. 18, the frame 1800 also carries the same Service Set Identifier (SSID) that represents the wireless network irrespective of the frequency band. This means that a BSSID is uniquely mapped to a single SSID and further simplifies the management of wireless networks. However, it is possible that, similar to current operations, more than one BSSIDs are mapped to the same SSID.

Regardless of the frequency band used to transmit the Beacon/Probe Response frames, since the Beacon/Probe Response frames advertise the same BSSID and SSID, a non-AP STA will see a single BSS. However, this may create some issues for legacy (non multi-band) non-AP STAs since they may not be able to explicitly specify the frequency band on which they wish to Associate. This issue may be overcome by the non-AP STA transmitting the Authentication, Association frames on the frequency band on which they wish to join. Irrespective of the BSSID/SSID specified in the Association frame, the AP will associate the non-AP STA on the frequency band on which the frames were received. The multi-band connection is even simpler in this case. Regardless of the frequency band used to Authenticate and/or Associate, for instance, a single Association Instance is required between a multi-band AP and a multi-band STA, and band specific Association is not necessary. Due to the different capabilities, during Authentication and/or Association, non-AP STAs may still indicate their supported bands using one or more Multi-band elements as explained in herein.

Figure 19:
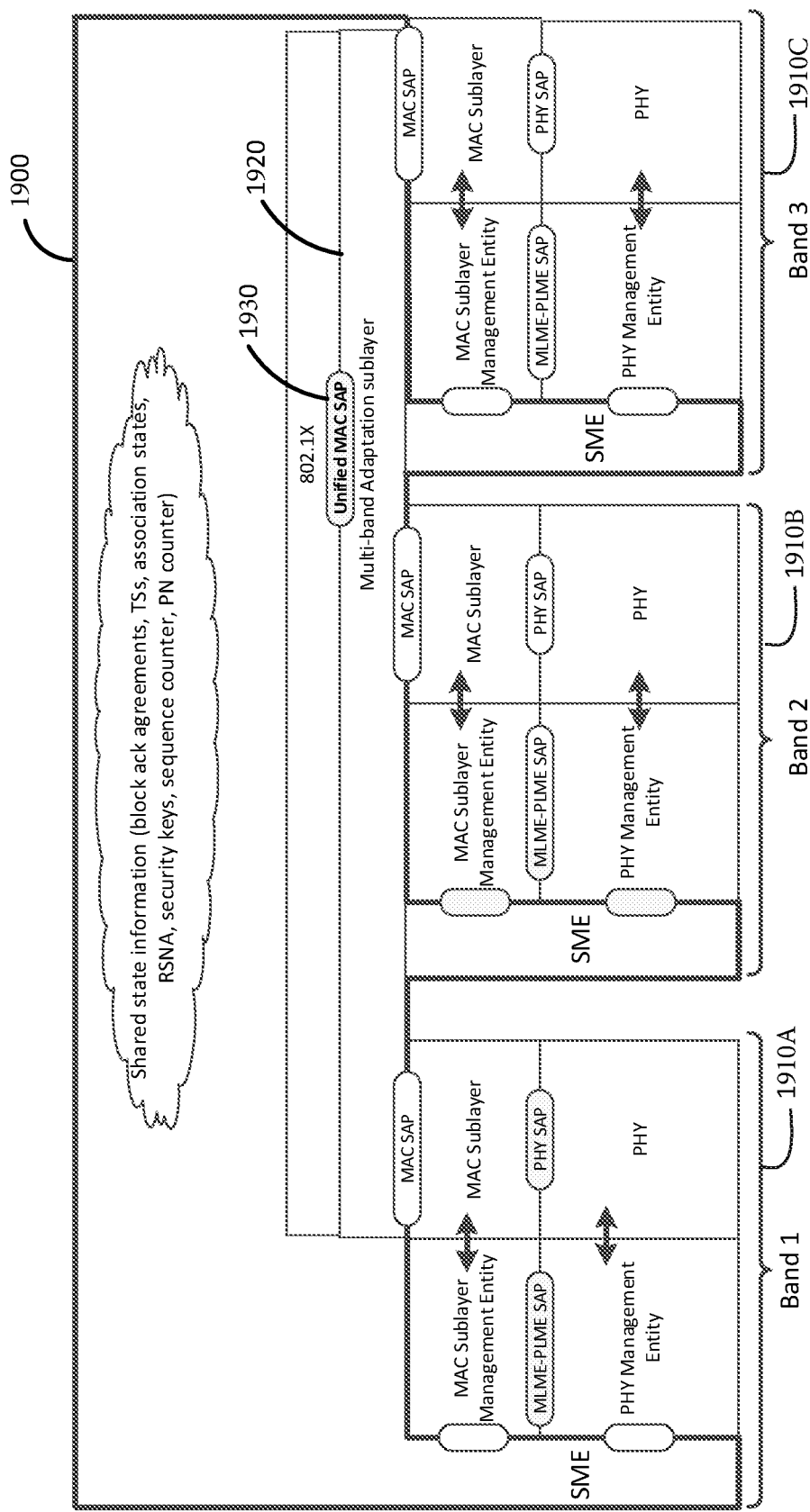
FIG. 19 is a reference model of a multi-band communication device (multi-band capable EHT AP and/or STA).

FIG. 19 is a model of a multi-band capable EHT AP and/or STA 1900. By way of example, the AP/STA 1900 includes three bands 1910A (Band 1), 1910B (Band 2), 1910C (Band 3). Each band includes one or more of Physical layer (PHY), MAC Sublayer, PHY Management Entity (PLME), and MAC Sublayer Management Entity (MLME), while a single Station Management Entity (SME) has access to all the band specific PHY and MAC layers.

As shown in FIG. 19, a multi-band device consist of separate PHY and MAC layers sets, one or more set for each frequency band. For simplicity, FIG. 19 shows a tri-band device, but example embodiments also include other types of band devices, such as dual-band devices, quad-band devices, etc.

Consider an example of a quad-band device that includes four distinct PHY and MAC layer sets, one set for the 2.4 GHz band, one set for the 5 GHz band, one set for the lower portion of the 6 GHz band (for example 6 GHz~6.49 GHz), and one set for the upper section of the 6 GHz band (for example 6.5 GHz~6.99 GHz). However, there is only a single Station Management entity that has access to the MAC and PHY layers of each band through the respective MAC Layer Management Entity (MLME) and PHY Management Entity (PLME). In order to simplify the management of the various band specific PHY and MAC layers, a Multi-band Adaptation sublayer 1920 sits on top of the band specific MAC layers and provides a unified MAC SAP 1930 to the upper layers. The Multi-band Adaptation sublayer 1920 interacts with the band specific MAC and PHY sublayers through the MAC Service Access Points (SAP) of each band specific MAC layer.

One advantage with this model is that the EHT MAC layer appears as a single MAC entity to the upper layers, and the Upper layers deal with a single layer (the Multi-band Adaptation sublayer 1920), which in turn takes the responsibility of managing the band specific MAC/PHY layers.

In an example embodiment, multi-band operation is natively enabled and negotiated during a multi-band Connection. A multi-band STA is considered over-the WM enabled (i.e. the STA may start communicating over the Wireless Medium (WM)) on all applicable frequency bands following a successful association and may proceed to engage in multi-band communication over any/all the associated bands without any further negotiations between the AP and STAs. For example, Fast Session Transfer (FST) is not required for multi-band communications between devices that has completed the multi-band connection.

For devices with additional 60 GHz UF, the 60 GHz OF can be managed as per baseline, for example using FST, OCT etc. Such devices may be said to include two STAs: a sub-7 GHz STA (capable of multi-band communication on frequency bands less than 7 GHz) and a 60 GHz STA.

Figure 20:
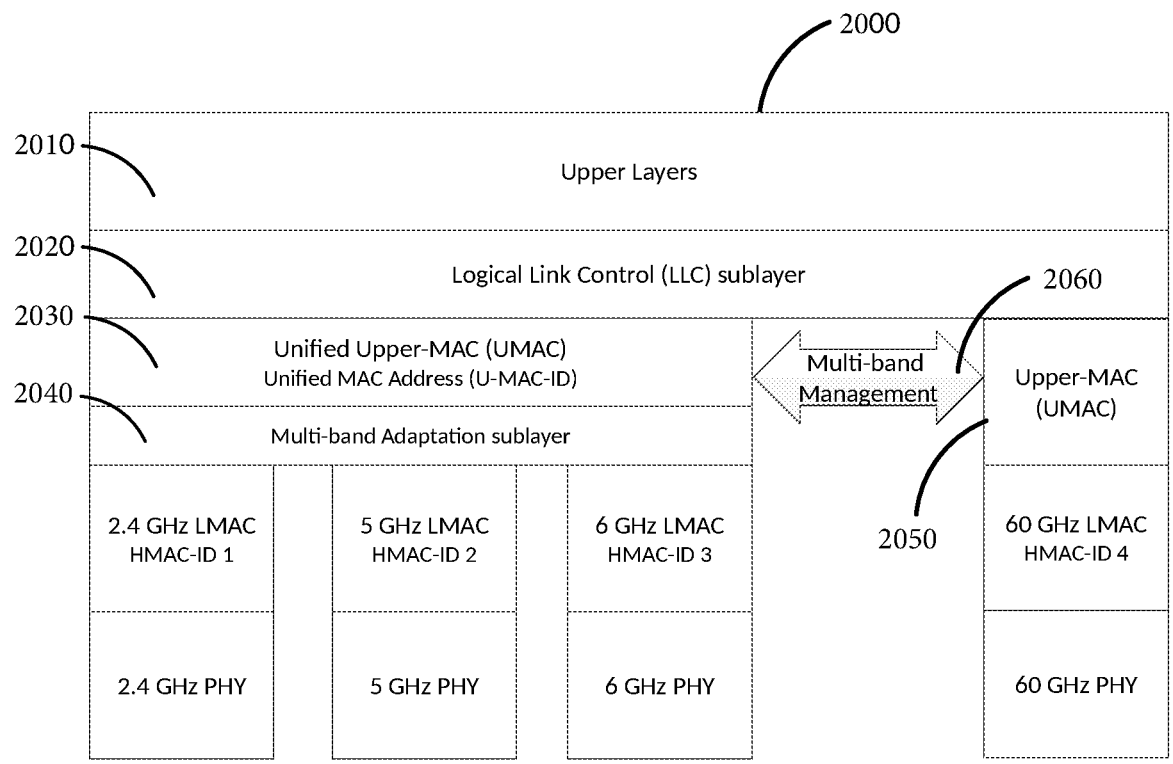
FIG. 20 is a simplified reference model of a multi-band communication device.

FIG. 20 is a model of a multi-band communication device 2000. The device includes Upper Layers 2010, Logical Link Control (LLC) sublayer 2020, Unified Upper-MAC (UMAC) 2030, and Multi-band Adaptation sublayer 2040. The sublayer 2040 couples to and/or communicates with 2.4 GHz Lower MAC (LMAC), (with its own Hardware MAC ID, HMAC-ID 1), 2.4 GHz PHY, 5 GHz LMAC, (with its own Hardware MAC ID, HMAC-ID 2), 5 GHz PHY, 6 GHz LMAC, (with its own Hardware MAC ID, HMAC-ID 3), and 6 GHz PHY. The LLC sublayer 2020 couples to and/or communicates with Upper-MAC (UMAC) 2050, 60 GHz LMAC, (with its own Hardware MAC ID, HMAC-ID4), and 60 GHz PHY. The UMAC 2030 communicates with the UMAC 2050 via Multi-band Management 2060.

As shown in FIG. 20, the Upper layers 2010 as well as the LLC sublayers 2020 may be shared between all the bands. The lower left side shows the layers specific to the sub-7 GHz bands while the right side are layers specific to 60 GHz band. The MAC layers may be further split into an Upper MAC (UMAC) layer and a Lower MAC (LMAC) layer. The Lower MAC layers is responsible for MAC functions that may depend on the actual frequency band used for communication such as A-MDPU aggregation/de-aggregation, CRC creation, Address 1 filtering, MPDU encryption/decryption, Duplicate Detection, ACK transmissions, Block Ack score-boarding, MCS adaptation, etc. The Upper MAC is responsible for band agnostic MAC functions, such as A-MSDU aggregation/de-aggregation, Sequence Number Assignment, Re-transmissions etc.

Since the 60 GHz MAC functions may be very different from the sub-7 GHz MAC functions, separate Upper MAC layers are maintained. However, a single Upper MAC layer 2030 provides the interface between the upper layers and the band specific Lower MAC layers. Traditionally, each wireless interface is assigned a hardware MAC address (HMAC-ID). As such, each band specific Lower MAC may have its own MAC address that it uses as its transmitter/receiver address. An EHT device may choose any one of its HMAC-ID as its unified MAC address (U-MAC-ID), and the U-MAC-ID may be used to identify an EHT device. An EHT AP may choose the U-MAC-ID as the BSSID for a multi-band EHT BSS.

The sub-7 GHz MAC layer appears as a single MAC entity to the upper layers. The actual band used for communication is transparent to the upper layers. The multi-band adaptation sublayer 2040 is responsible for deciding the actual band to use for outgoing packets. The multi-band adaptation sublayer 2040 is also responsible for MAC-address switching (between the U-MAC-ID and the HMAC-ID and vice versa) during transmission/reception if required.

An EHT AP may also record an associated STA's U-MAC-ID as part of its Association Record. The Upper MAC layer may then need not be concerned about the actual HMAC-ID used by a destination device in a particular frequency band but may directly use the U-MAC-ID of a destination device as the Destination Address (DA) of any outgoing MPDUs. The multi-band adaptation sublayer 1720 will take care of replacing the DA of the outgoing MPDUs to the correct HMAC-ID. As for the 60 GHz band, baseline Multi-band Management 2060 and related protocols such as FST may be utilized for session transfers between the sub-7 GHz bands and the 60 GHz band.

In case there are associated single band non-AP STAs operating on different bands (e.g., STA1 on 5 GHz and STA2 on 6 GHz), traditionally communication between STA1 and STA2 would need to go through the AP before being forwarded to a router in the Distribution System (DS), which will route it back to the STA through the same AP. In order to avoid this, a multi-band AP may also choose to implement a simple L3 routing function within itself that keeps a record of the L3 addresses (e.g., IP) of all associated devices across the different bands. If the AP finds the destination L3 address on its own routing table, instead of forwarding the packet to the DS, the AP can simply send the packet out through the band on which the device is associated.

Figure 21:
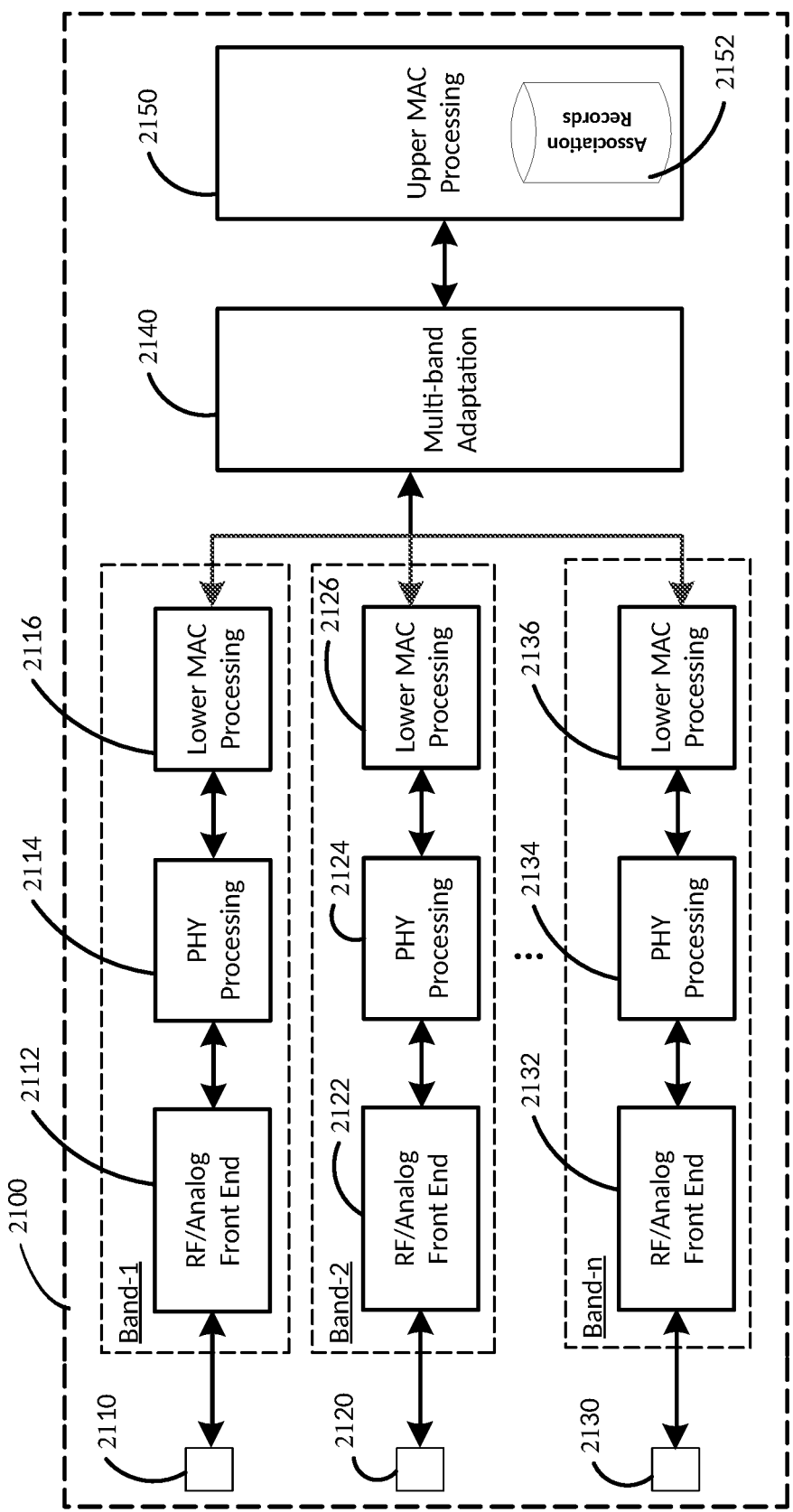
FIG. 21 is a simplified block diagram of a multi-band communication device that operates in multiple different frequency bands (shows as n bands with n being an integer greater than one).

FIG. 21 is a simplified block diagram of a multi-band communication device 2100 that operates in multiple different frequency bands (shows as n bands with n being an integer greater than one). Antenna 2110 couples to and/or communicates with hardware/software in Band-1 that includes RF/Analog Front End 2112, PHY Processing 2114, and Lower MAC Processing 2116. Antenna 2120 couples to and/or communicates with hardware/software in Band-2 that includes RF/Analog Front End 2122, PHY Processing 2124, and Lower MAC Processing 2126. Antenna 2130 couples to and/or communicates with hardware/software in Band-n that includes RF/Analog Front End 2132, PHY Processing 2134, and Lower MAC Processing 2136. Although a single antenna is shown on each frequency band in FIG. 21, it is also possible that there may be multiple antennas on each frequency band, for example used for spatial diversity, Multi-User MIMO (MU-MIMO) etc. The Lower MAC Processing 2116/2126/2136 coupled to and/or communicate with each other and Multi-band Adaptation 2140 and Upper MAC Processing 2150 that includes Association Records 2152. The Association Records 2152 is contained in AP devices but not in non-AP devices.

Figure 22:
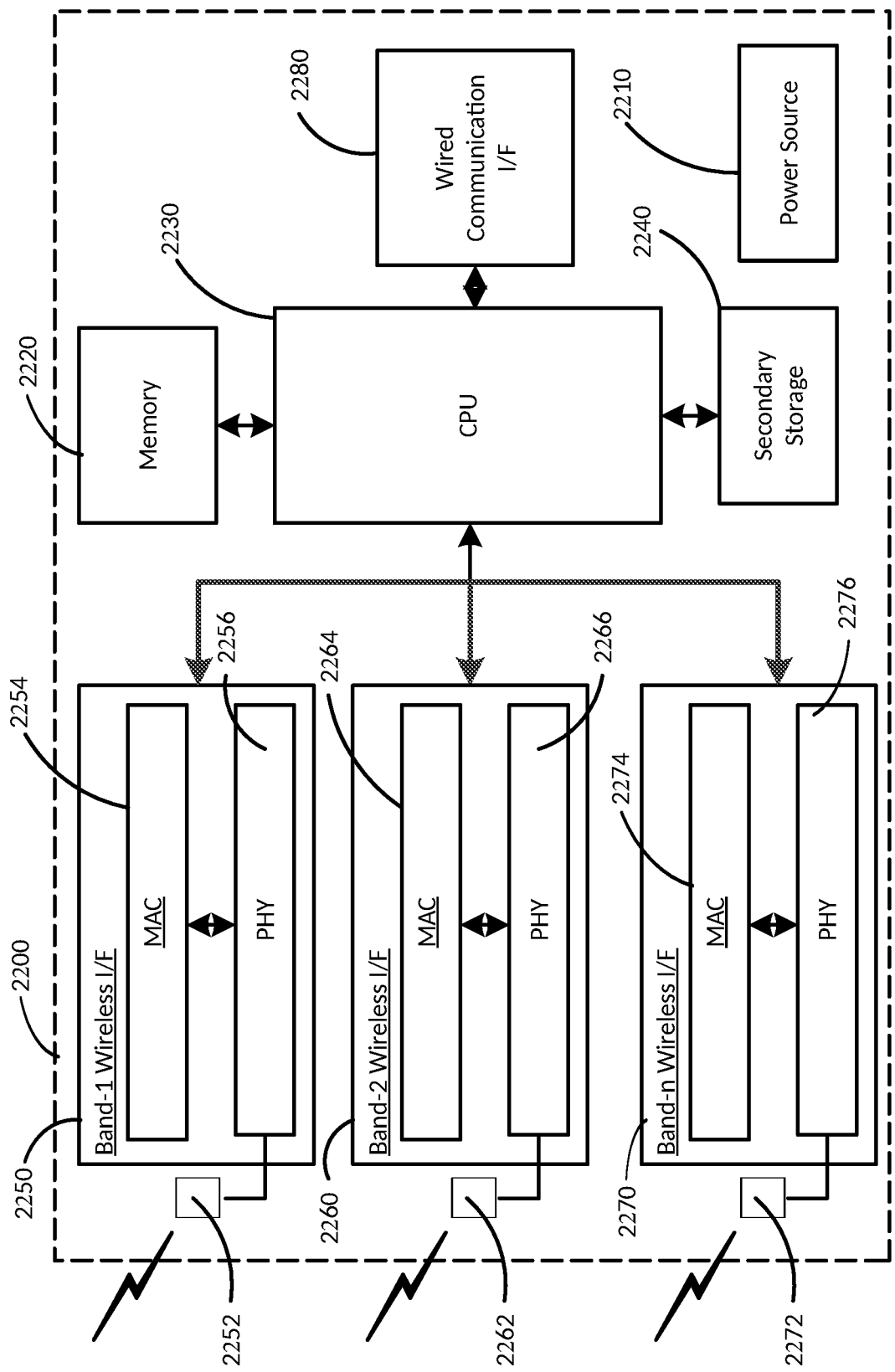
FIG. 22 is a detailed block diagram of a multi-band communication device that operates in multiple different frequency bands (shows as n bands with n being an integer greater than one).

FIG. 22 is a detailed block diagram of a multi-band communication device 2200 that operates in multiple different frequency bands (shows as n bands with n being an integer greater than one). Band-1 Wireless I/F 2250 couples to and/or communicates with transmitter/receiver 2252 and includes MAC 2254 and PHY 2256. Band-2 Wireless I/F 2260 couples to and/or communicates with transmitter/receiver 2262 and includes MAC 2264 and PHY 2266. Band-n Wireless I/F 2270 couples to and/or communicates with transmitter/receiver 2272 and includes MAC 2274 and PHY 2276. Bands Wireless I/F 2250/2260/2270 couple to and/or communicate with each other and central processing unit (CPU) 2230, memory 2220, secondary storage 2240, wired communication I/F 2080. The circuit is powered with a power source 2210, which may be battery for non-AP devices while in the case of AP devices, may be mainpowers in most cases. Although the block diagram 2200 is applicable to both AP and non-AP devices, each of the components used in an AP device may be a lot more complicated and powerful than those used in non-AP devices. When the block diagram 2200 is applicable to AP device, CPU 2230 generates frames that include actions related to a first frequency band (e.g. band-1) and to at least one other frequency band (e.g. band-2) in which the AP device transmits. When the block diagram 2200 is applicable to non-AP device, CPU 2230 generates frames in response to the received frames from AP device.

In FIG. 22, the Lower MAC functions may be implemented within the Wireless I/Fs (in hardware/firmware), while the Multi-band Adaptation layer as well as Upper MAC functions may be implement as software within the CPU.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

Other example embodiments include, but are not limited to the following examples.

A multi-band communication apparatus includes a transmitter and a receiver. The transmitter transmits, in a wireless network and to multi-band communication devices, frames on a frequency band that include actions related to the frequency band and to at least one other frequency band in which the multi-band communication apparatus transmits. The receiver receives, in the wireless network, from the multi-band communication devices, frames on the frequency band that include actions related to the frequency band and to the at least one other frequency band in which the multi-band communication apparatus receives.

For the multi-band communication apparatus, the actions of the frames on the frequency band include authenticating the multi-band communication devices to the frequency band and to the at least one other frequency band of the multi-band communication apparatus.

For the multi-band communication apparatus, the actions of the frames on the frequency band include associating or reassociating the multi-band communication devices to the frequency band and to the at least one other frequency band of the multi-band communication apparatus.

For the multi-band communication apparatus, the actions of the frames on the frequency band include de-authenticating the multi-band communication devices to the frequency band and to the at least one other frequency band of the multi-band communication apparatus.

For the multi-band communication apparatus, the actions of the frames on the frequency band include disassociating the multi-band communication devices to the frequency band and to the at least one other frequency band of the multi-band communication apparatus.

For the multi-band communication apparatus, the multi-band communication apparatus is a multi-band access point (AP) and maintains a single association record for a multi-band communication device that is applicable to the frequency band and to the other frequency bands.

For the multi-band communication apparatus, the single association record for the multi-band communication device includes an association state variable, an Association ID (AID), and security keys.

A multi-band access point (AP) comprises a transmitter and a receiver. The transmitter transmits frames to non-station (STA) APs in a single wireless network that simultaneously operates on multiple frequency bands. The receiver receives frames from the non-STA APs in the single wireless network that simultaneously operates on the multiple frequency bands.

For the multi-band AP, the single wireless network is identified by a single Basic Service Set Identifier (BSSID) on all the multiple frequency bands.

For the multi-band AP, the BSSID is a MAC address of a wireless interface on any of the multiple frequency bands.

For the multi-band AP, the multi-band AP communicates with a non-STA AP on one or plurality of the multiple frequency bands following a successful association of the non-STA AP on a single one of the multiple frequency bands.

For the multi-band AP, all Beacon frames and probe Response frames transmitted by the multi-band AP over the multiple frequency bands advertise a same Basic Service Set Identifier (BSSID).

A communication method comprises receiving, by an access point (AP) in a wireless network, from non-AP stations (STAs), request frames in a single frequency band that request to authenticate and associate the non-AP STAs over multiple different frequency bands in which the AP operates in the wireless network; and transmitting, by the AP, to the non-AP STAs, response frames in the single frequency band that authenticate and associate the non-AP STAs over multiple different frequency bands in which the AP operates in the wireless network.

The communication method further comprises transmitting, by the AP in the wireless network and to the non-AP STAs in the single frequency band, beacon frames and probe response frames that advertise the AP as operating in the multiple different frequency bands that include at least two of 2.4 GHz, 5 GHz, and 6 GHz.

The communication method further comprises transmitting, by the AP in the wireless network and to the non-AP STAs in the single frequency band, probe response frames that advertise neighboring APs as operating in the multiple different frequency bands.

A multi-band communication apparatus for communicating with multi-band communication devices comprises a processor and a transceiver. The processor generates frames that include actions related to a first frequency band and to at least one other frequency band in which the multi-band communication apparatus transmits. The transceiver transmits the frames on the first frequency band.

While exemplary embodiments have been presented in the foregoing detailed description of the present embodiments, it should be appreciated that a vast number of variations exist. It should further be appreciated that the exemplary embodiments are only examples, and are not intended to limit the scope, applicability, operation, or configuration of the disclosure in any way. Rather, the foregoing detailed description will provide those skilled in the art with a convenient road map for implementing exemplary embodiments of the disclosure, it being understood that various changes may be made in the function and arrangement of steps and method of operation described in the exemplary embodiments without departing from the scope of the disclosure as set forth in the appended claims.

The present disclosure can be realized by software, hardware, or software in cooperation with hardware. Each functional block used in the description of each embodiment described above can be partly or entirely realized by an LSI such as an integrated circuit (IC), and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

In addition, the present disclosure can be realized by any kind of apparatus, device or system having a function of communication, which is referred to as a communication apparatus. Some non-limiting examples of such a communication apparatus include a phone (e.g, cellular (cell) phone, smart phone), a tablet, a personal computer (PC) (e.g., laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

What is claimed is:

1. A non-Access Point (non-AP) multi-band apparatus comprising:
    a transmitter which, in operation, transmits an Association Request frame to an Access Point (AP) multi-band apparatus over a single frequency band, the Association Request frame indicating a plurality of frequency bands requested for a multi-band setup for simultaneous communication on multiple bands including the single frequency band and the multi-band setup being operable to be performed on any of the multiple bands; and
    a receiver which, in operation, receives from the AP multi-band apparatus an Association Response frame over the single frequency band, the Association Response frame indicating frequency band(s) that are successfully accepted,
    wherein after the multi-band setup is established, the receiver simultaneously receives a plurality of signals over the single frequency band and the successfully accepted frequency band(s).

2. The non-AP multi-band apparatus of claim 1, wherein the Association Request frame includes a common information field and a plurality of band specific fields.

3. The non-AP multi-band apparatus of claim 1, wherein a single association record is maintained by the AP multi-band apparatus for the single frequency band and the plurality of frequency bands.

4. The non-AP multi-band apparatus of claim 3, wherein the single association record includes at least one of an association state variable, an Association ID (AID), and security keys for each of the plurality of frequency bands.

5. The non-AP multi-band apparatus of claim 1, wherein a unified MAC address is used to identify the non-AP multi-band apparatus.

6. The non-AP multi-band apparatus of claim 1, wherein a single Association ID (AID) is allocated to the non-AP multi-band apparatus.

7. The non-AP multi-band apparatus of claim 1, wherein a single MAC Service Access Point (SAP) is used to manage a plurality of band-specific MAC layers and a plurality of band-specific PHY layers.

8. A communication method for a non-Access Point (non-AP) multi-band apparatus, the communication method comprising:
    transmitting an Association Request frame to an Access Point (AP) multi-band apparatus over a single frequency band, the Association Request frame indicating a plurality of frequency bands requested for a multi-band setup for simultaneous communication on multiple bands including the single frequency band and the multi-band setup being operable to be performed on any of the multiple bands;
    receiving from the AP multi-band apparatus an Association Response frame over the single frequency band, the Association Response frame indicating frequency band(s) that are successfully accepted; and
    simultaneously receiving a plurality of signals over the single frequency band and the successfully accepted frequency band(s) after the multi-band setup is established.

9. The communication method of claim 8, wherein the Association Request frame includes a common information field and a plurality of band specific fields.

10. The communication method of claim 8, wherein a single association record is maintained by the AP multi-band apparatus for the single frequency band and the plurality of frequency bands.

11. The communication method of claim 10, wherein the single association record includes at least one of an association state variable, an Association ID (AID), and security keys for each of the plurality of frequency bands.

12. The communication method of claim 8, wherein a unified MAC address is used to identify the non-AP multi-band apparatus.

13. The communication method of claim 8, wherein a single Association ID (AID) is allocated to the non-AP multi-band apparatus.

14. The communication method of claim 8, wherein a single MAC Service Access Point (SAP) is used to manage a plurality of band-specific MAC layers and a plurality of band-specific PHY layers.

* * * * *